United States Patent
Shiohara

(10) Patent No.: US 9,467,539 B2
(45) Date of Patent: Oct. 11, 2016

(54) ELECTRONIC APPARATUS

(71) Applicant: BROTHER KOGYO KABUSHIKI KAISHA, Nagoya-shi, Aichi-ken (JP)

(72) Inventor: Yukio Shiohara, Nagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 37 days.

(21) Appl. No.: 14/642,090

(22) Filed: Mar. 9, 2015

(65) Prior Publication Data

US 2015/0282368 A1 Oct. 1, 2015

(30) Foreign Application Priority Data

Mar. 27, 2014 (JP) .................................. 2014-066585

(51) Int. Cl.
| | |
|---|---|
| H05K 7/14 | (2006.01) |
| H04M 1/02 | (2006.01) |
| G06F 1/16 | (2006.01) |
| B41J 3/46 | (2006.01) |
| B41J 29/02 | (2006.01) |
| B41J 29/13 | (2006.01) |

(52) U.S. Cl.
CPC ........... *H04M 1/02* (2013.01); *B41J 3/46* (2013.01); *B41J 29/02* (2013.01); *B41J 29/023* (2013.01); *B41J 29/13* (2013.01); *G06F 1/16* (2013.01)

(58) Field of Classification Search
USPC ................ 361/728–732, 752, 796, 800, 792
See application file for complete search history.

(56) References Cited

U.S. PATENT DOCUMENTS

| | | | | | |
|---|---|---|---|---|---|
| 5,457,600 | A | * | 10/1995 | Campbell | H01R 25/00 307/150 |
| 5,689,400 | A | * | 11/1997 | Ohgami | G06F 1/1616 361/679.27 |
| 6,021,290 | A | * | 2/2000 | Hamada | G03G 21/206 399/92 |
| 7,787,237 | B2 | * | 8/2010 | Yamaguchi | B41J 3/46 345/156 |
| 8,339,805 | B2 | * | 12/2012 | Fukushima | G03G 15/80 361/807 |
| 2014/0092163 | A1 | * | 4/2014 | Shiohara | B41J 29/46 347/19 |
| 2014/0293369 | A1 | | 10/2014 | Hori et al. | |

FOREIGN PATENT DOCUMENTS

| | | |
|---|---|---|
| JP | 8-006472 A | 1/1996 |
| JP | 2001-260467 A | 9/2001 |
| JP | 2014-195199 A | 10/2014 |

* cited by examiner

*Primary Examiner* — Hung S Bui

(74) *Attorney, Agent, or Firm* — Merchant & Gould P.C.

(57) ABSTRACT

An electronic apparatus includes a housing having a contact surface to be in contact with an installation surface, a first circuit board disposed in the housing and extending parallel to the contact surface, a second circuit board disposed in the housing and extending perpendicular to the first circuit board, and a panel unit disposed at the housing. The panel unit includes a casing having a first end and a second end opposite to the first end in a first direction, at least one of a display unit and an input unit, and a support portion supported by the housing and protruding from the second end of the casing. The second circuit board is positioned behind the casing of the panel unit and in a range, in the first direction, from the second end of the casing to a protruding end of the support portion.

15 Claims, 10 Drawing Sheets

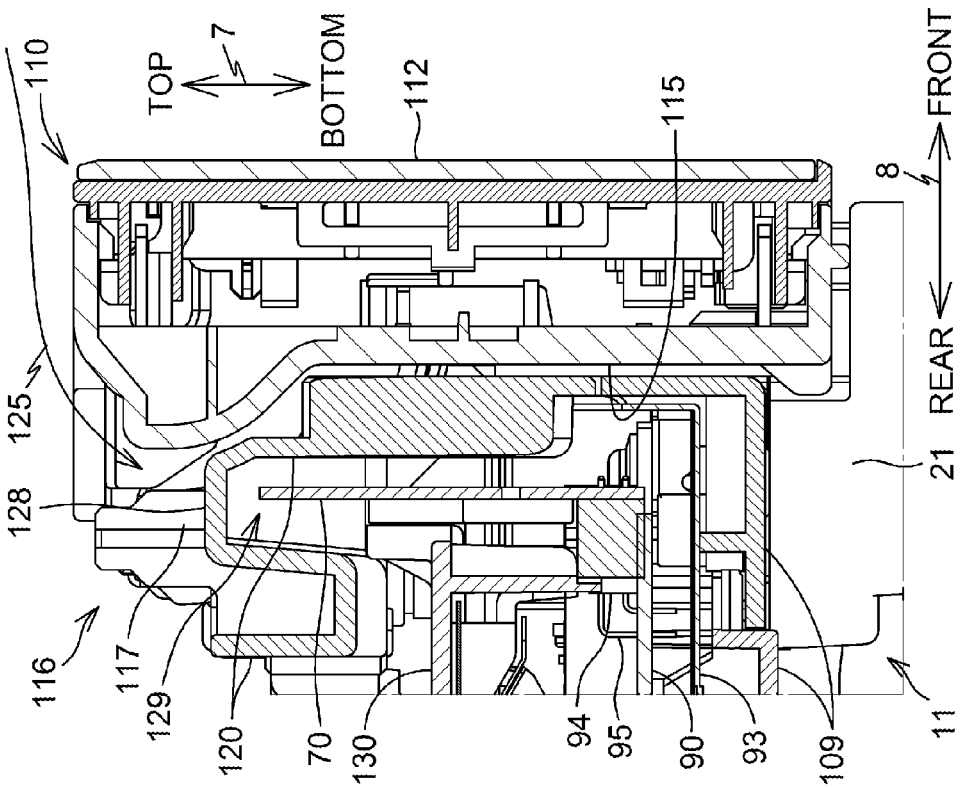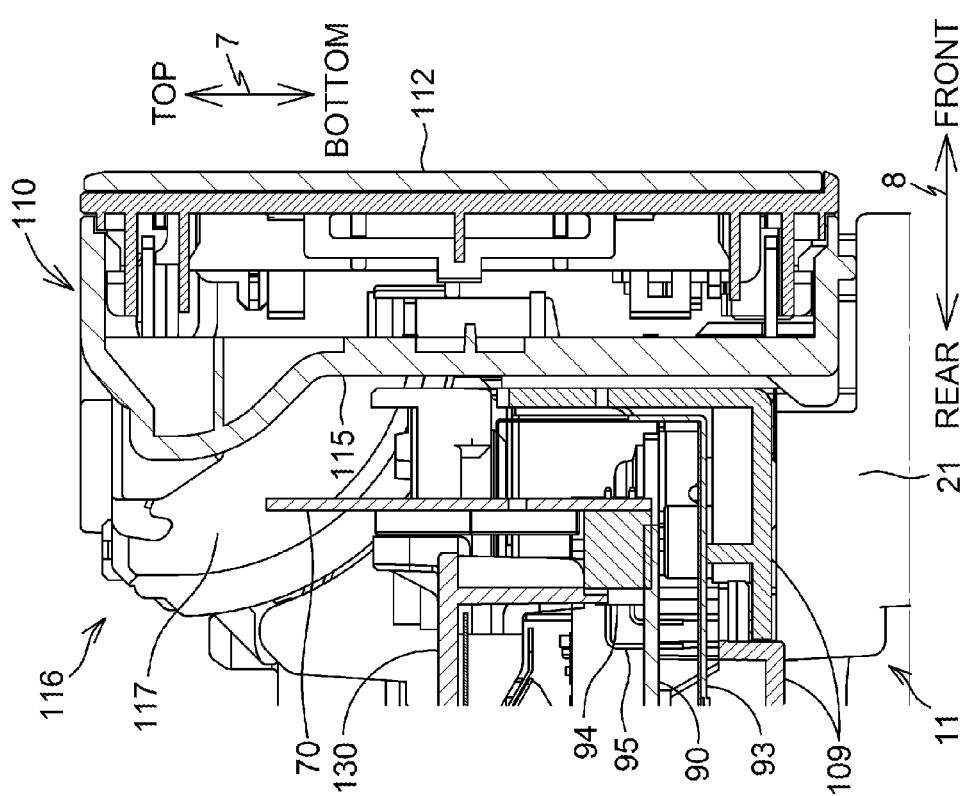

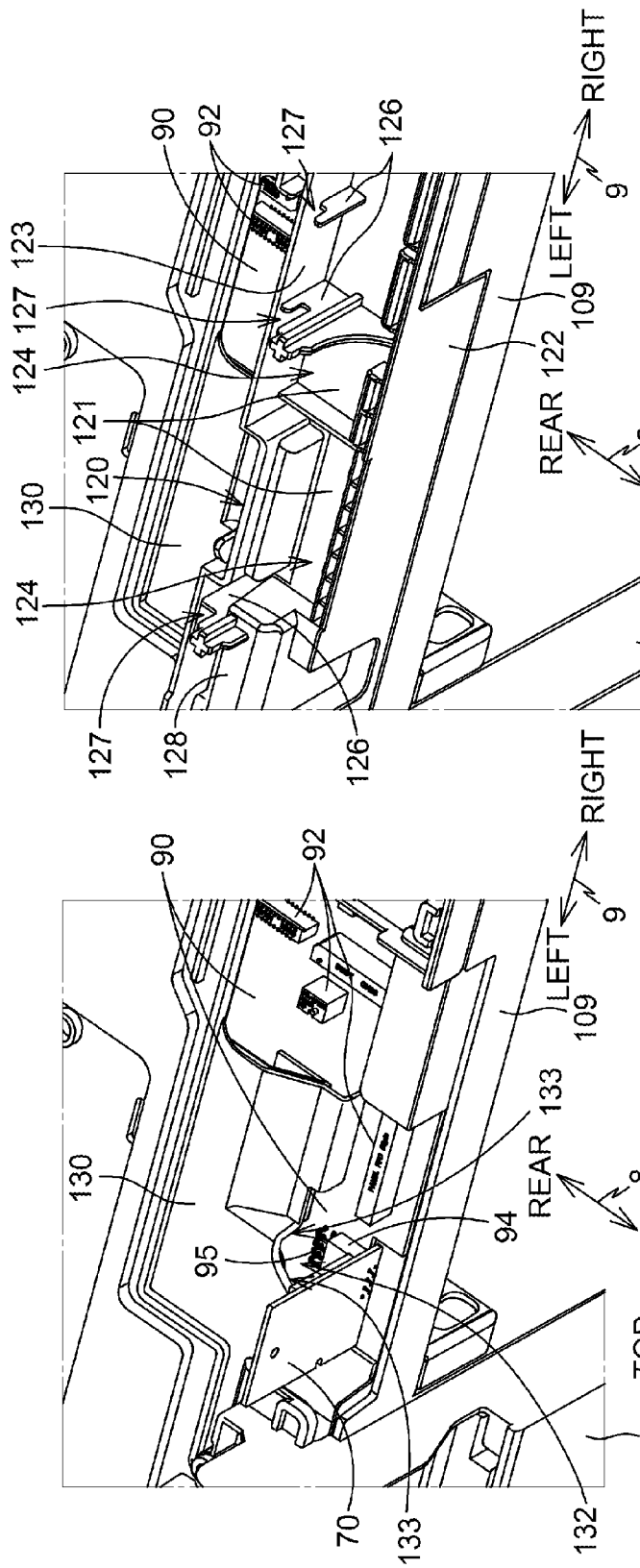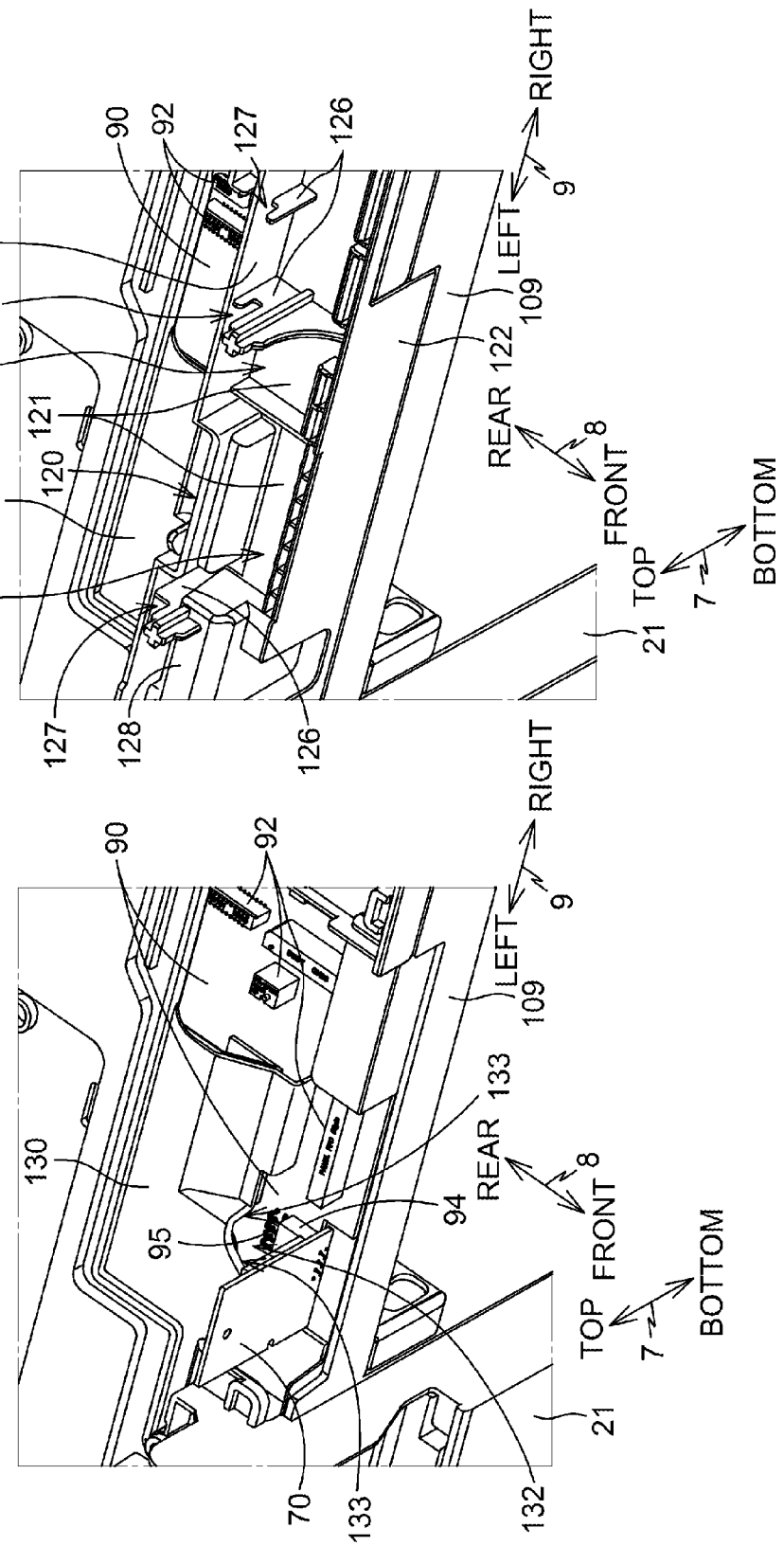

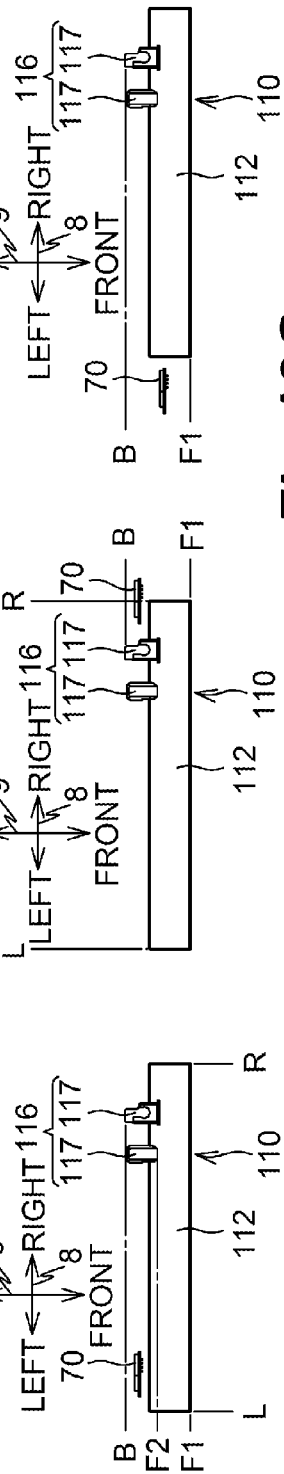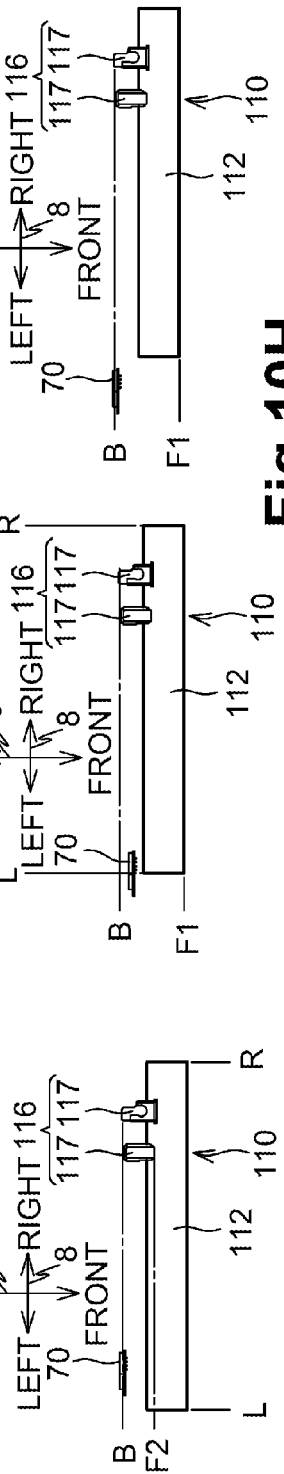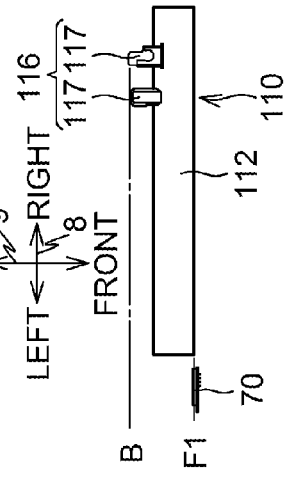

ELECTRONIC APPARATUS

CROSS-REFERENCE TO RELATED APPLICATION

This application claims priority from Japanese Patent Application No. 2014-066585, filed on Mar. 27, 2014, which is incorporated herein by reference in its entirety.

TECHNICAL FIELD

Aspects described herein relate to an electronic apparatus including a panel unit and a first circuit board, and a second circuit board.

BACKGROUND

A known electronic apparatus includes a first circuit board and a second circuit board. The first circuit board includes a control circuit for controlling operation of the electronic apparatus. The second circuit board includes another circuit different from the control circuit. There is a need to prevent an increase in size of the electronic apparatus that accommodates therein such circuit boards of two different types.

SUMMARY

An electronic apparatus may include a panel unit including a display unit for displaying an image and an input unit for allowing a user to input operation instructions. The first circuit board and the second circuit board may need to be positioned with respect to the panel unit without causing an increase in size of the electronic apparatus. In addition, the first circuit board and the second circuit board may need to be positioned so as not to electrically interfere with each other.

Some embodiments of the present disclosure provide for a technique for reducing a size of an electronic apparatus, including a panel unit, in which a first circuit board and a second circuit board may not interface with each other electrically.

According to one or more aspects of the disclosure, an electronic apparatus comprises a housing having a contact surface configured to be in contact with an installation surface, a first circuit board disposed in the housing and extending parallel to the contact surface of the housing, a second circuit board disposed in the housing and extending perpendicular to the first circuit board, and a panel unit disposed at the housing. The first circuit board includes a control circuit configured to control operation of the electronic apparatus. The second circuit board is electrically connected to the first circuit board. The panel unit includes a casing having a first end and a second end opposite to the first end in a first direction, at least one of a display unit and an input unit which are disposed at the first end of the casing, and a support portion supported by the housing and protruding from the second end of the casing in the first direction away from the first end of the casing. The display unit is configured to display an image and the input unit is configured to allow input of an operation instruction. The second circuit board is positioned behind the casing of the panel unit and in a range, in the first direction, from the second end of the casing to a protruding end of the support portion.

According to one or more aspects of the disclosure, an electronic apparatus comprises a housing having a contact surface configured to be in contact with an installation surface, a first circuit board disposed in the housing and including a control circuit configured to control operation of the electronic apparatus, a second circuit board disposed in the housing and electrically connected to the first circuit board, and a panel unit disposed at the housing and including at least one of a display unit configured to display an image and an input unit configured to allow input of an operation instruction. The first circuit board has a first surface and a second surface which are parallel to the contact surface of the housing. The second circuit board has a third surface and a fourth surface which are perpendicular to the first surface and the second surface of the first circuit board. The panel unit has a first end and a second end opposite to the first end in a first direction which is perpendicular to the third surface and the fourth surface of the second circuit board. The second circuit board is disposed adjacent to the panel unit and at least a portion of the second circuit board is positioned in a range, in the first direction, from the first end to the second end of the panel unit.

According to the aspects of the disclosure, the electronic apparatus may be reduced in size.

DESCRIPTION OF THE DRAWINGS

For a more complete understanding of the present disclosure, needs satisfied thereby, and the objects, features, and advantages thereof, reference now is made to the following descriptions taken in connection with the accompanying drawings.

FIG. 6A is an enlarged view depicting a portion enclosed with a dotted-and-dashed line in FIG. 5 in the illustrative embodiment according to one or more aspects of the disclosure, wherein the first cover is omitted.

FIG. 6B is an enlarged view depicting the portion enclosed with the dotted-and-dashed line in FIG. 5 in the illustrative embodiment according to one or more aspects of the disclosure, wherein the first cover is included.

FIG. 7A is a perspective view depicting a portion surrounding a communication board in the printer unit in the illustrative embodiment according to one or more aspects of the disclosure, wherein the first cover is omitted.

FIG. 7B is a perspective view depicting the portion surrounding the communication board in the printer unit in the illustrative embodiment according to one or more aspects of the disclosure, wherein the first cover is included.

FIGS. 10A to 10H are schematic plan views each depicting a positional relationship between the communication board and the panel unit in the illustrative embodiment according to one or more aspects of the disclosure.

DETAILED DESCRIPTION

Figure 1:
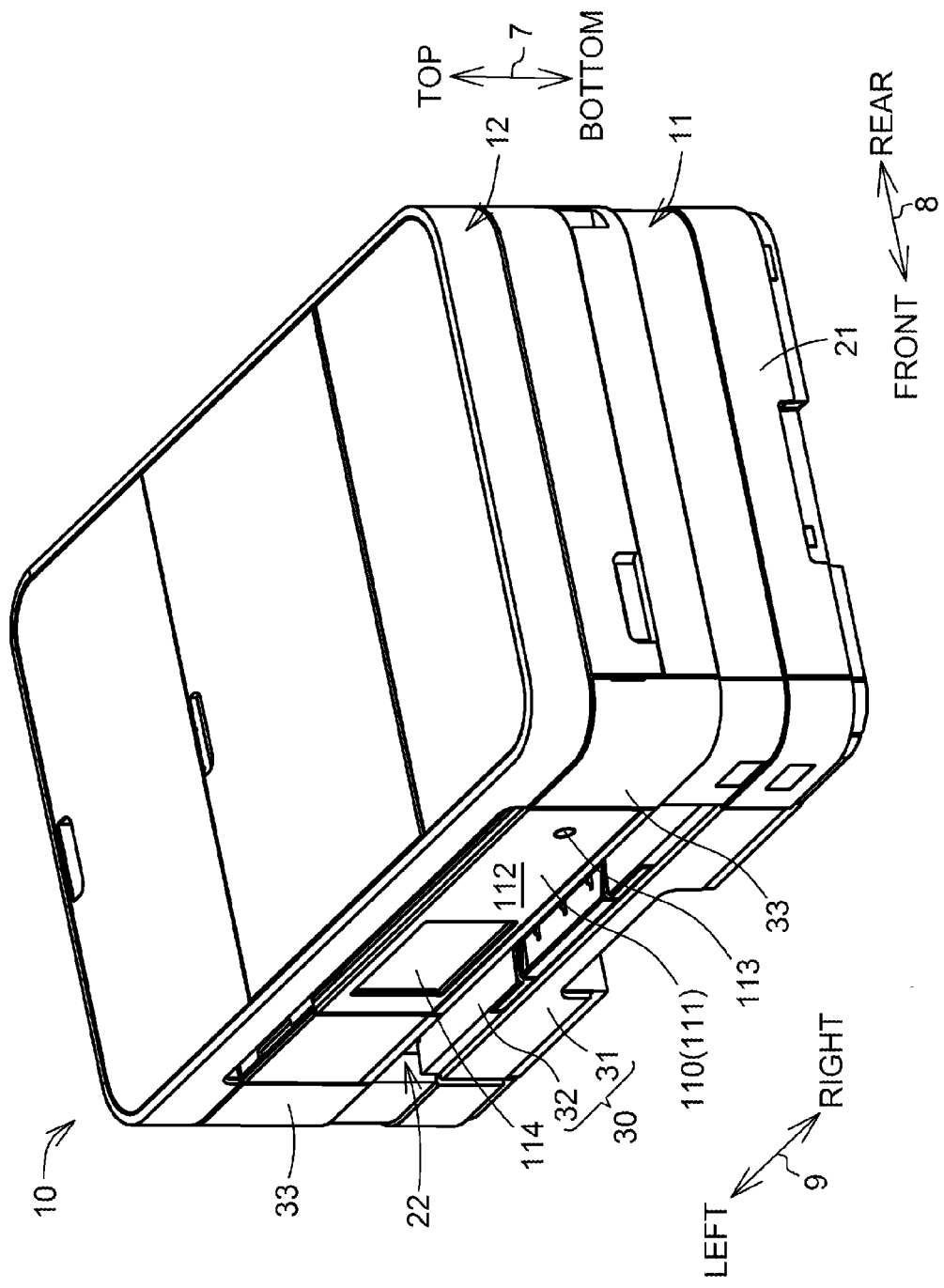
FIG. 1 is a perspective view depicting an appearance of a multifunction device in an illustrative embodiment according to one or more aspects of the disclosure.

Illustrative embodiments according to one or more aspects are described below with reference to the accompanying drawings. The illustrative embodiments described below are only examples. Various changes, arrangements and modifications may be applied therein without departing from the spirit and scope of the disclosure. As depicted in FIG. 1, a top-bottom direction 7 is defined with reference to an orientation of a multifunction device 10 that is disposed in which it is intended to be used. A side of the multifunction device 10, in which a panel unit 110 is disposed, is defined as the front of the multifunction device 10. A front-rear direction 8 is defined with reference to the front of the multifunction device 10. A right-left direction 9 is defined with respect to the multifunction device 10 as viewed from its front. The top-bottom direction 7, the front-rear direction 8, and the right-left direction 9 are perpendicular to each other. Hereinafter, an illustrative embodiment according to the one or more aspects of the disclosure is described.

[Overview of Multifunction Device 10]

As depicted in FIG. 1, the multifunction device 10 (as an example of an electronic apparatus) includes a housing 21 having a generally rectangular parallelepiped shape. The multifunction device 10 further includes a control board 90 (as an example of a first circuit board), a communication board 70 (as an example of a second circuit board), and a panel unit 110. The control board 90 and the communication board 70 are disposed inside the housing 21. The panel unit 110 is disposed at the front of the housing 21.

The multifunction device 10 further includes a scanner unit 12 at its upper portion and a printer unit 11 at its lower portion. The scanner unit 12 is configured to read an image from a document, e.g., a recording sheet, using an image sensor (not depicted) to obtain image data. The printer unit 11 is configured to record an image onto a sheet 6 (refer to FIG. 2), e.g., a recording sheet, fed from a feed cassette 30. The multifunction device 10 has multiple functions of, for example, printing, scanning, copying, and wireless communication with an external device.

The scanner unit 12 may be a known flatbed-type scanner. A detailed description of an internal configuration of the scanner unit 12 will be omitted. The scanner unit 12 includes a platen glass and the image sensor, which are disposed at an upper portion inside the housing 21.

Figure 2:
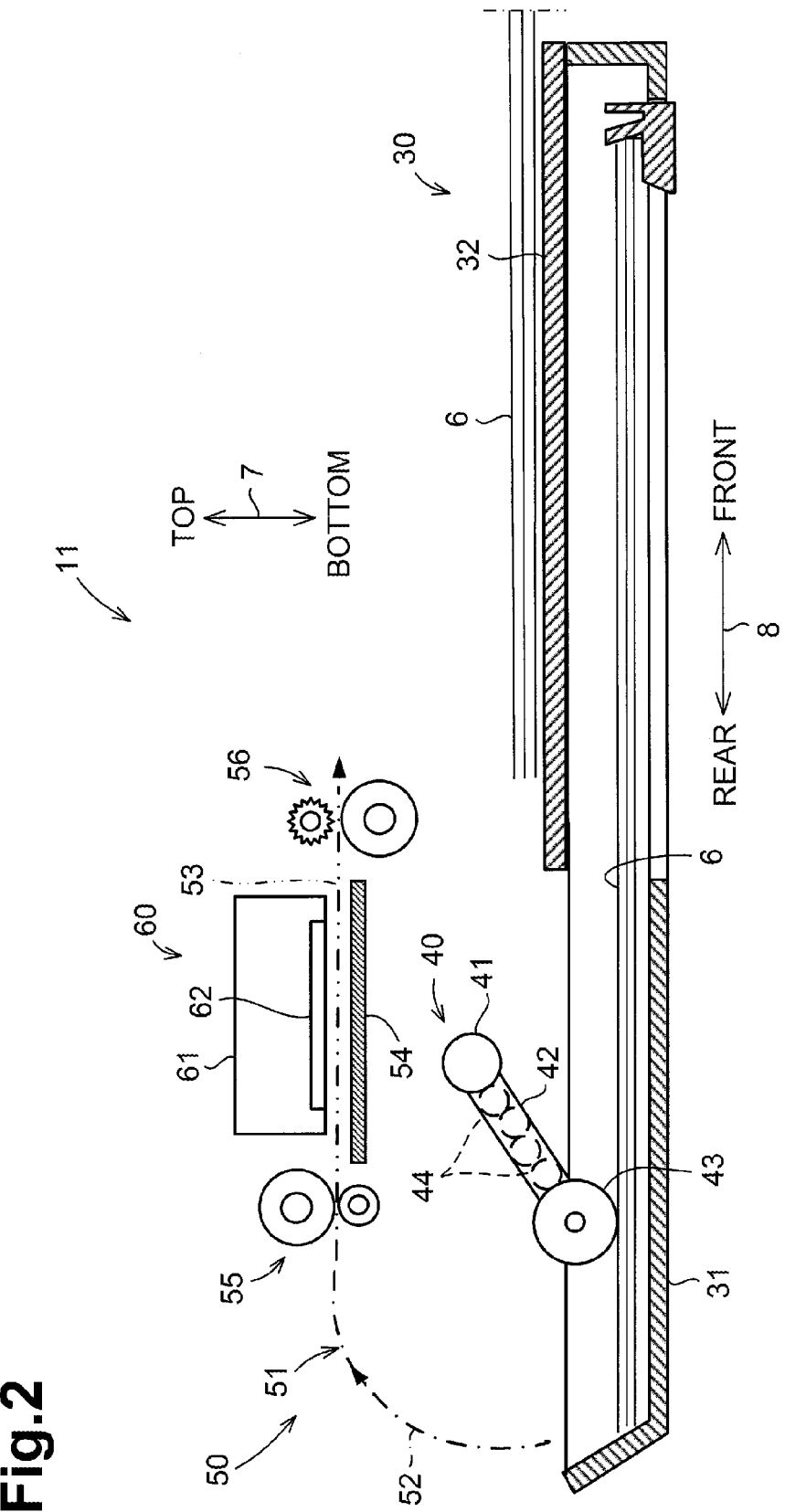
FIG. 2 is a schematic cross-sectional view depicting an internal configuration of a printer unit in the illustrative embodiment according to one or more aspects of the disclosure.

As depicted in FIG. 2, the printer unit 11 includes the feed cassette 30, a feeding unit 40, a conveying unit 50, and a recording unit 60, which are disposed in the lower portion inside the housing 21.

[Feed Cassette 30]

As depicted in FIG. 2, the feed cassette 30 includes a main tray 31 and a discharge tray 32. The main tray 31 is configured to support one or more sheets 6 subjected to image recording. The discharge tray 32 is configured to support one or more sheets 6 having an image recorded thereon. As depicted in FIG. 1, the feed cassette 30 is disposed at the bottom of the housing 21. The housing 21 has an opening 22 in its front. The feed cassette 30 is attachable to and detachable from the housing 21 via the opening 22.

[Feeding Unit 40]

As depicted in FIG. 2, the feeding unit 40 includes a support shaft 41, an arm 42, and a feed roller 43. The support shaft 41 is rotatably supported by a frame (not depicted). The arm 42 is pivotably supported by the support shaft 41 at its one end. The feed roller 43 is rotatably supported by the other end of the arm 42. The arm 42 includes a plurality of gears 44. The plurality of gears 44 is configured to transmit rotation of the support shaft 41 to the feed roller 43. In response to rotation of the support shaft 41 caused by a drive motor (not depicted), the feed roller 43 rotates to feed one or more sheets 6 into a conveying path 51.

[Conveying Unit 50]

As depicted in FIG. 2, the conveying unit 50 includes a guide member (not depicted), a platen 54, a conveying roller pair 55, and a discharge roller pair 56. The guide member and the platen 54 define a portion of the conveying path 51. The conveying path 51 includes a curved path 52 indicated by a dotted-and-dashed line and a straight path 53 indicated by a double-dotted-and-dashed line. The curved path 52 extends curvedly upward from an upper rear end of the main tray 31 in the front-rear direction 8. The straight path 53 extends straightly toward the front from an end of the curved path 52. The platen 54 is disposed above a rear portion of the feed cassette 30 in the front-rear direction 8. The platen 54 defines a portion of the straight path 53 from below. The platen 54 supports a sheet 6 thereon at the time of recording an image on the sheet 6.

The conveying roller pair 55 is disposed behind the platen 54. While the conveying roller pair 55 pinches a sheet 6 being conveyed in the conveying path 51, the conveying roller pair 55 is driven by the drive motor (not depicted) to further convey the sheet 6 in a conveying direction of an arrow along the straight path 53 indicated by the double-dotted-and-dashed line in FIG. 2.

The discharge roller pair 56 is disposed in front of the platen 54. While the discharge roller pair 56 pinches the sheet 6 being conveyed in the conveying path 51, the discharge roller pair 56 is driven by the drive motor (not depicted) to further convey the sheet 6 in the conveying direction of the arrow along the straight path 53 indicated by the double-dotted-and-dashed line in FIG. 2.

The conveying roller pair 55 and the discharge roller pair 56 convey the sheet 6 intermittently along the top of the platen 54. During the intermittent conveyance, the recording unit 60 recodes an image onto the sheet 6. Thereafter, the discharge roller pair 56 discharges the sheet 6 having an image thereon onto the discharge tray 32.

[Recording Unit 60]

As depicted in FIG. 2, the recording unit 60 includes a carriage 61 and a recording head 62. The carriage 61 is disposed above the platen 54. The recording head 62 is mounted on the carriage 61. The carriage 61 is supported by a guide rail (not depicted) such that the carriage 61 reciprocates in the right-left direction 9 along the guide rail. The drive motor (not depicted) causes the carriage 61 to reciprocate in the right-left direction 9. The recording head 62 is supplied with ink from an ink cartridge (not depicted). The recording head 62 ejects ink droplets onto a sheet 6 supported by the platen 54.

[Housing 21]

As described above, the housing 21 has a generally rectangular parallelepiped shape. As depicted in FIG. 1, the housing 21 includes a pair of front walls 33 that partially constitute the front of the housing 21. The pair of front walls 33 includes a right wall and left wall that are disposed at respective end portions of the housing 21 in the right-left direction 9. A panel unit 110 is disposed between the right wall and the left wall of the pair of front walls 33. That is, the panel unit 110 is disposed at the housing 21.

Figure 8:
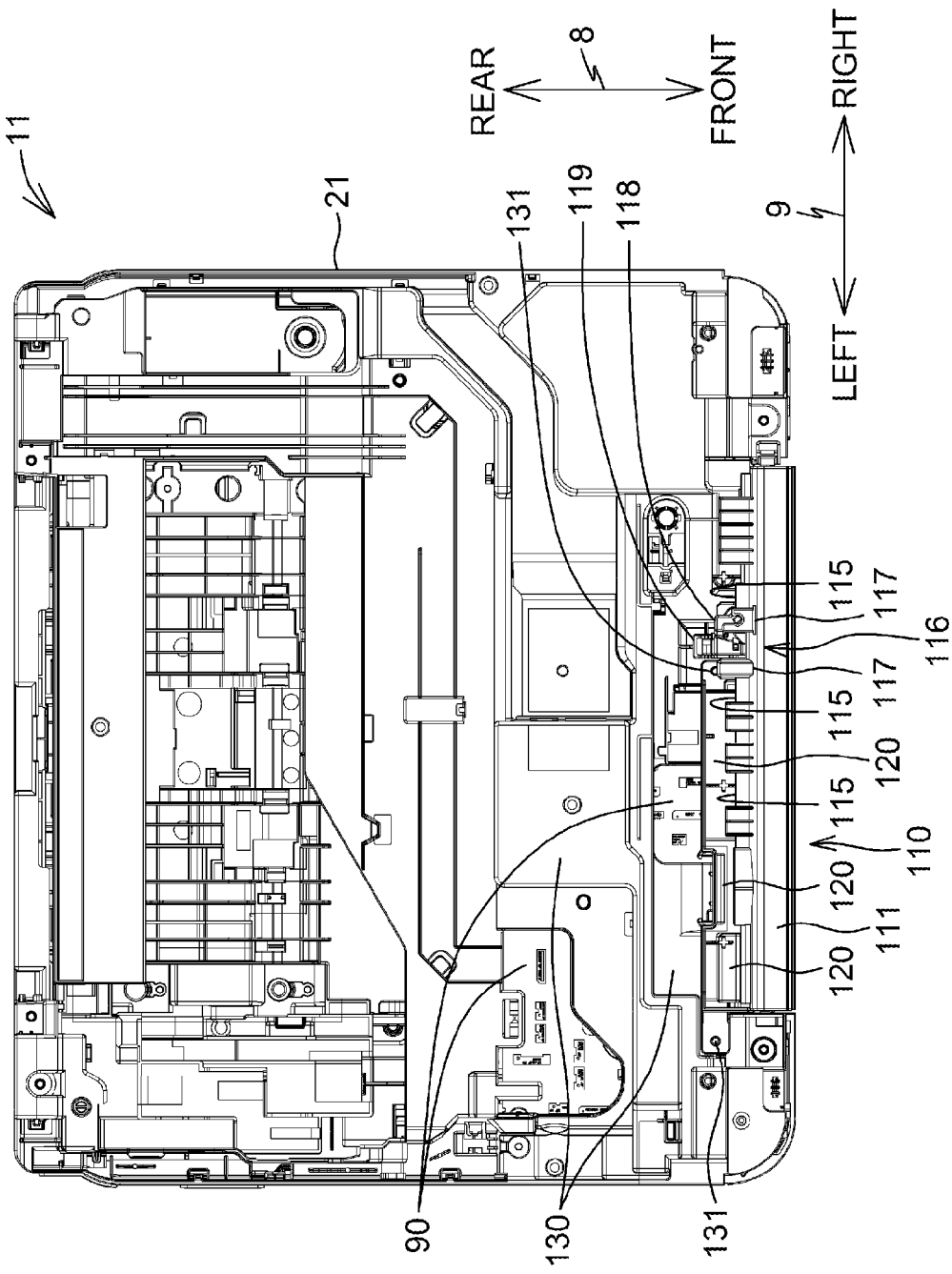
FIG. 8 is a plan view depicting the printer unit in the illustrative embodiment according to one or more aspects of the disclosure, wherein the first cover is included.
Figure 9:
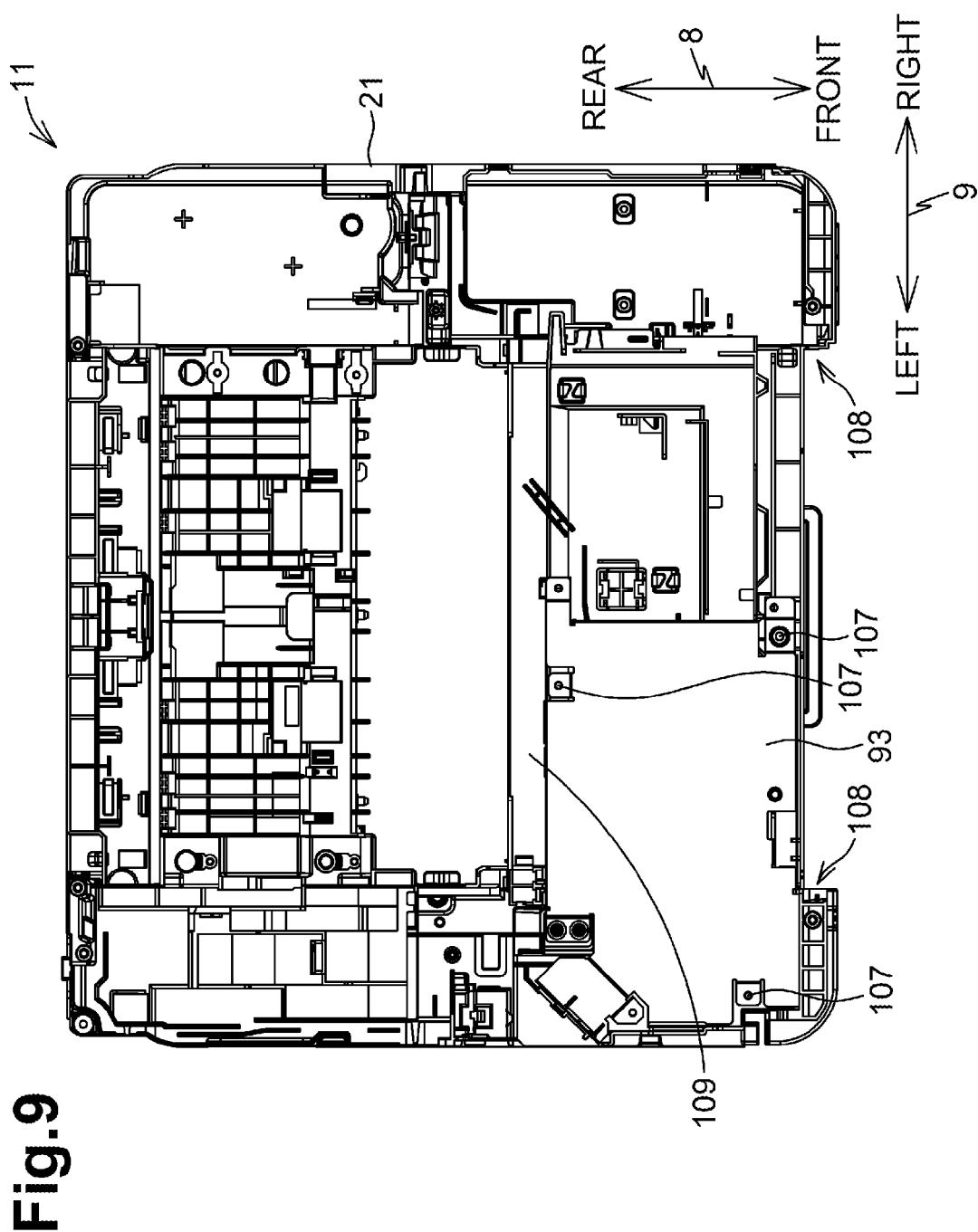
FIG. 9 is a plan view depicting the printer unit in the illustrative embodiment according to one or more aspects of the disclosure, wherein a control board is omitted.

The housing 21 includes a first cover 120 (refer to FIG. 8), a second cover 130 (refer to FIG. 3), a sheet metal shield 93 (refer to FIG. 9), and a support plate 109 (refer to FIG. 9). The first cover 120 covers the communication board 70 (refer to FIG. 4) from above. The second cover 130 covers the control board 90 (refer to FIG. 4) from above. The sheet metal shield 93 is disposed below the control board 90 while a surface of the sheet metal shield 93 extends parallel to a surface of the control board 90. The sheet metal shield 93 supports the control board 90 from below. The support plate 109 supports the sheet metal shield 93 from below.

[Panel Unit 110]

Figure 3:
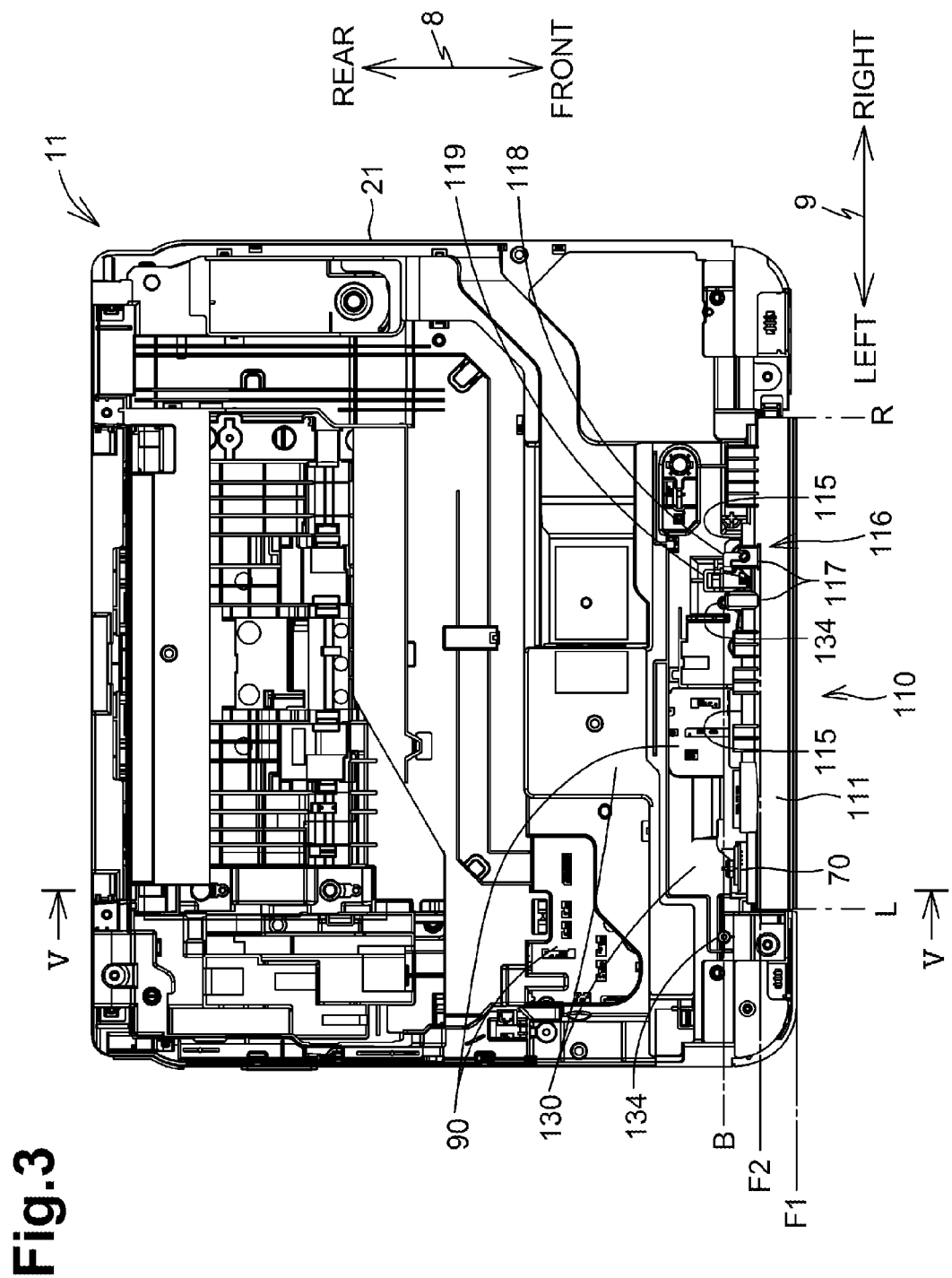
FIG. 3 is a plan view depicting the printer unit in the illustrative embodiment according to one or more aspects of the disclosure, wherein a first cover is omitted.
Figure 5:
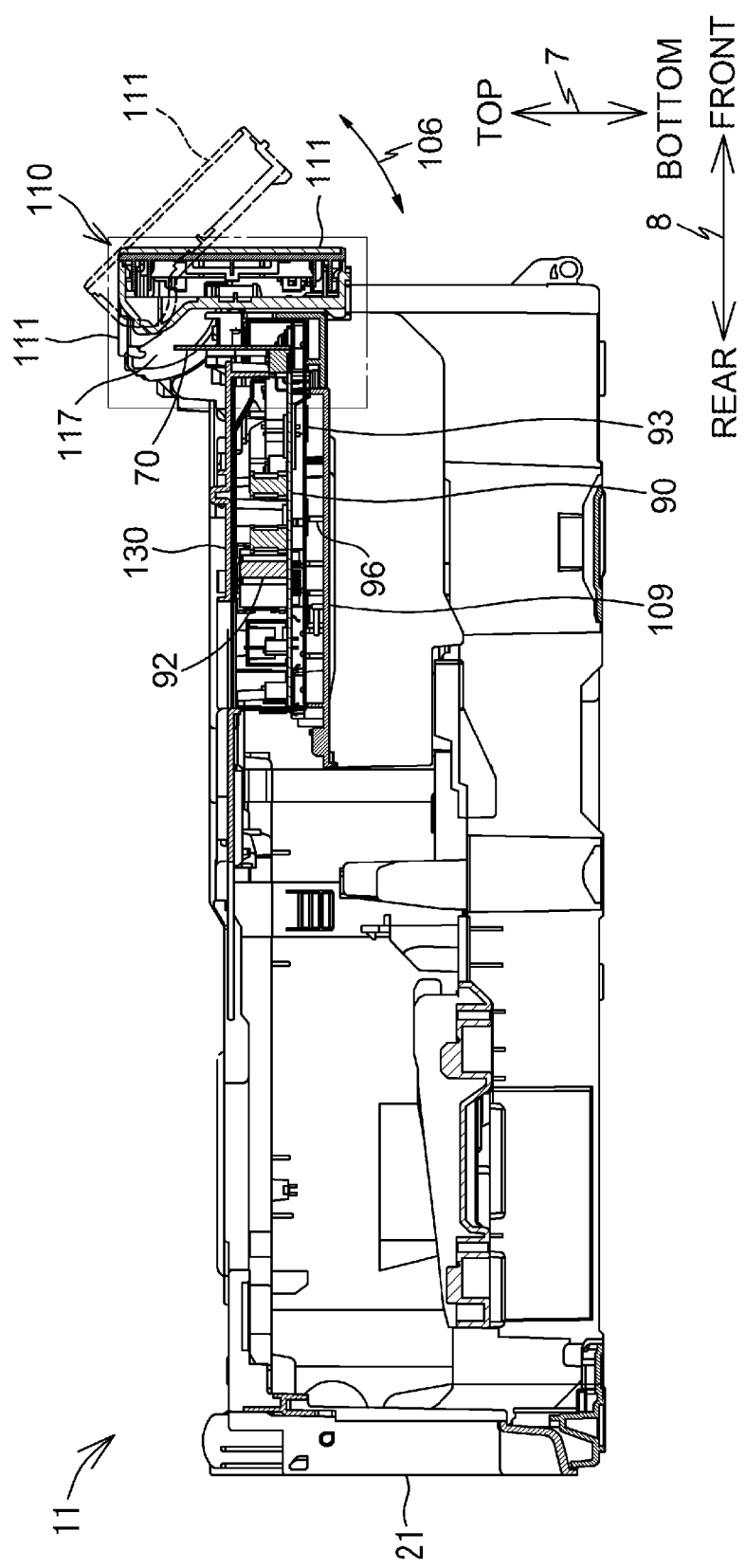
FIG. 5 is a sectional view taken along line V-V of FIG. 3 in the illustrative embodiment according to one or more aspects of the disclosure.

As depicted in FIGS. 1 and 5, the panel unit 110 includes a casing 111, an input unit 113, a display unit 114, and a support portion 116 (refer to FIGS. 3 and 8). The casing 111 has a rectangular parallelepiped box shape and a thin body in the front-rear direction 8. The casing 111 has an opening (not depicted) in its front surface 112 (as an example of an outer surface of a panel unit). The input unit 113 and the display unit 114 are disposed inside the casing 111 and are exposed to the outside through the opening of the casing 111. The support portion 116 is pirovtably supported by the housing 21.

The casing 111 of the panel unit 110 includes protrusions (not depicted) at both end surfaces of an upper end portion in the right-left direction 9. The right and left protrusions protrude rightward and leftward, respectively, from the respective end surfaces. The housing 21 of the multifunction device 10 has recesses 108 (refer to FIG. 4) at respective positions corresponding to the protrusions of the casing 111. While the protrusions are received in the respective recesses 108, the panel unit 110 is supported by the housing 21 such that the panel unit 110 is pivotable about an axis extending along a direction that the projections protrude (e.g., a direction parallel to the right-left direction 9). That is, the panel unit 110 is pivotable in a direction indicated by a double-headed arrow 106 in FIG. 5.

The input unit 113 may be a button. An operation instruction for the multifunction device 10 is inputted through pressing of the button. In the illustrative embodiment, the input unit 113 includes a single button as depicted in FIG. 1. Nevertheless, in other embodiments, for example, the input unit 113 may include a plurality of buttons. In still other embodiments, the input unit 113 may include, for example, a dial or a lever, as well as a button.

The display unit 114 may be a liquid crystal panel. The liquid crystal panel displays thereon information relating to the multifunction device 10, e.g., images. Nevertheless, in other embodiments, for example, the liquid crystal panel may be a touch panel. In this case, the touch panel may function as the display unit 114 and the input unit 113.

In the illustrative embodiment, the panel unit 110 includes both the input unit 113 and the display unit 114. Nevertheless, in other embodiments, for example, the panel unit 110 may include one of the input unit 113 and the display unit 114.

As depicted in FIG. 3, the support portion 116 includes a pair of protrusions 117, a pivoting member 118, and an urging member (not depicted), e.g., a spring. The protrusions 117 protrude rearward from a rear surface 115 of the casing 111 and are spaced apart from each other in the right-left direction 9. The pivoting member 118 is supported by the right protrusion 117 such that the pivoting member 118 is pivotable about an axis extending along the top-bottom direction 7. The urging member urges the pivoting member 118 toward the left protrusion 117.

The housing 21 further includes an engagement member 119. The engagement member 119 is fixed to the housing 21 while being disposed between the protrusions 117. The engagement member 119 has a plurality of indentations (not depicted) on its right surface along a pivoting direction of the panel unit 110 (e.g., the direction of the arrow 106 indicated in FIG. 5) while the indentations are spaced apart from each other. A distal end portion of the pivoting member 118 engages with one of the plurality of indentations of the engagement member 119.

The panel unit 110 is retained at a particular angle in accordance with a position at which the distal end portion of the pivoting member 118 engages with one of the plurality of indentations. When a pivoting force that is stronger than an urging force of the urging member acts on the casing 111, the pivoting member 118 pivots in a direction away from the indentation with which the engagement member 119 is engaged, against the urging force of the urging member. Thus, the panel unit 110 is allowed to pivot in the direction of the arrow 106 (refer to FIG. 5).

The panel unit 110 is pivotable between a first position (e.g., a position of the panel unit 110 indicated by a solid line in FIG. 5) and a second position (e.g., a position of the panel unit 110 indicated by a dashed line in FIG. 5). When the panel unit 110 is located at the first position, the front surface 112 of the panel unit 110 extends along both the top-bottom direction 7 and the right-left direction 9. When the panel unit 110 is located at the second position, a lower end (e.g., the distal end) of the panel unit 11 is located at a higher position than the lower end of the panel unit 110 that is located at the first position. When the panel unit 110 is located at the first position, the front surface 112 of the panel unit 119 extends in parallel to both a front surface (as an example of a third surface) and a rear surface (as an example of a fourth surface) of the communication board 70.

The configuration for pivoting the panel unit 110 is not limited to the configuration including the support portion 116 and the engagement member 119. In other embodiments, for example, a known configuration for pivoting the panel unit 110 may be adopted.

[First Cover 120]

As depicted in FIG. 8, the first cover 120 is a molded part that is made of synthetic resin and has a plate-like shape extending in the right-left direction 9. The first cover 120 extends leftward from a position below the left protrusion 117 of the panel unit 110, in the right-left direction 9, slightly beyond a left end of the panel unit 110. The first cover 120 is disposed behind and adjacent to the panel unit 110 in the front-rear direction 8. The first cover 120 is disposed at substantially the same height as a middle portion of the panel unit 110 in the top-bottom direction 7. The communication board 70 is disposed below the first cover 120.

The first cover 120 is supported by the second cover 130 (refer to FIG. 3) via pillars (not depicted) at its both end portions in the right-left direction 9. One ends of the pillars are fastened to the first cover 120 using screws through respective holes 131 in the first cover 120 and the other ends of the pillars are fastened to the second cover 130 using screws through respective holes 134 (refer to FIG. 3) in the second cover 130.

As depicted in FIG. 7B, the first cover 120 includes a bottom plate 121, a front plate 122, and a rear plate 123. The bottom plate 121 extends in the front-rear direction 8 and in the right-left direction 9. The front plate 122 extends upward from a front end of the bottom plate 121 and further extends generally in the right-left direction 9. The rear plate 123 extends upward from a rear end of the bottom plate 121 and further extends generally in the right-left direction 9. With this configuration, the first cover 120 has a recess 124 that is defined by the bottom plate 121, the front plate 122, and the rear plate 123 and extends in the right-left direction 9. If any liquid enters the inside of the main body from a gap between the upper end of the casing 111 of the panel unit 110 and the housing 21 of the multifunction device 10, the liquid runs in a direction indicated by an arrow 125 (refer to FIG. 6B) and is stored in the recess 124.

As depicted in FIG. 7B, the first cover 120 includes a plurality of holding portions 126. The holding portions 126 protrude upward from the bottom plate 121 and have cutouts 127, respectively. The cutouts 127 are recessed downward relative to upper ends of the holding portions 126. A cable (not depicted) extending from the panel unit 110 (more specifically, a cable extending from the input unit 113 and the display unit 114 disposed inside the casing 111) is held by the holding portions 126 while being positioned in the cutouts 127. That is, the cutouts 127 hold the cable extending from the panel unit 110.

As depicted in FIGS. 6B and 7B, the bottom plate 121 of the first cover 120 includes a projecting portion 128. The projecting portion 128 protrudes upward to a position above the communication board 70. Thus, a space 129 is provided below the projecting portion 128 and the communication board 70 is disposed in the space 129. That is, the projecting portion 128 covers the communication board 70 from above.

[Second Cover 130]

As depicted in FIGS. 3 and 5, the second cover 130 is a molded part that is made of synthetic resin and has a plate-like shape extending in the front-rear direction 8 and in the right-left direction 9. The second cover 130 occupies the substantially front half of the housing 21 of the multifunction device 10 in plan view. As described above, the second cover 130 supports the first cover 120 via the pillars.

The second cover 130 is disposed above the control board 90. That is, the second cover 130 covers the control board 90 from above. As depicted in FIG. 3, in the illustrative embodiment, the second cover 130 covers most portions of the control board 90 except a left rear portion and a right front portion of the control board 90.

As depicted in FIG. 7A, the second cover 130 has a cutout 132 that is recessed rearward relative to a front end of the second cover 130. The cutout 132 is defined in the second cover 130 such that the cutout 132 is positioned above a connector 94 that is mounted on the control board 90. The connector 94 is configured to connect the communication board 70. A front end 133 of the second cover 130 defining the cutout 132 extends generally along the connector 94 in plan view. Thus, the second cover 130 uncovers the connector 94 from above.

[Control Board 90]

The control board 90 is a printed board made of, for example, glass epoxy or paper phenol. At least a first surface of the control board 90 is printed with a wiring pattern.

Figure 4:
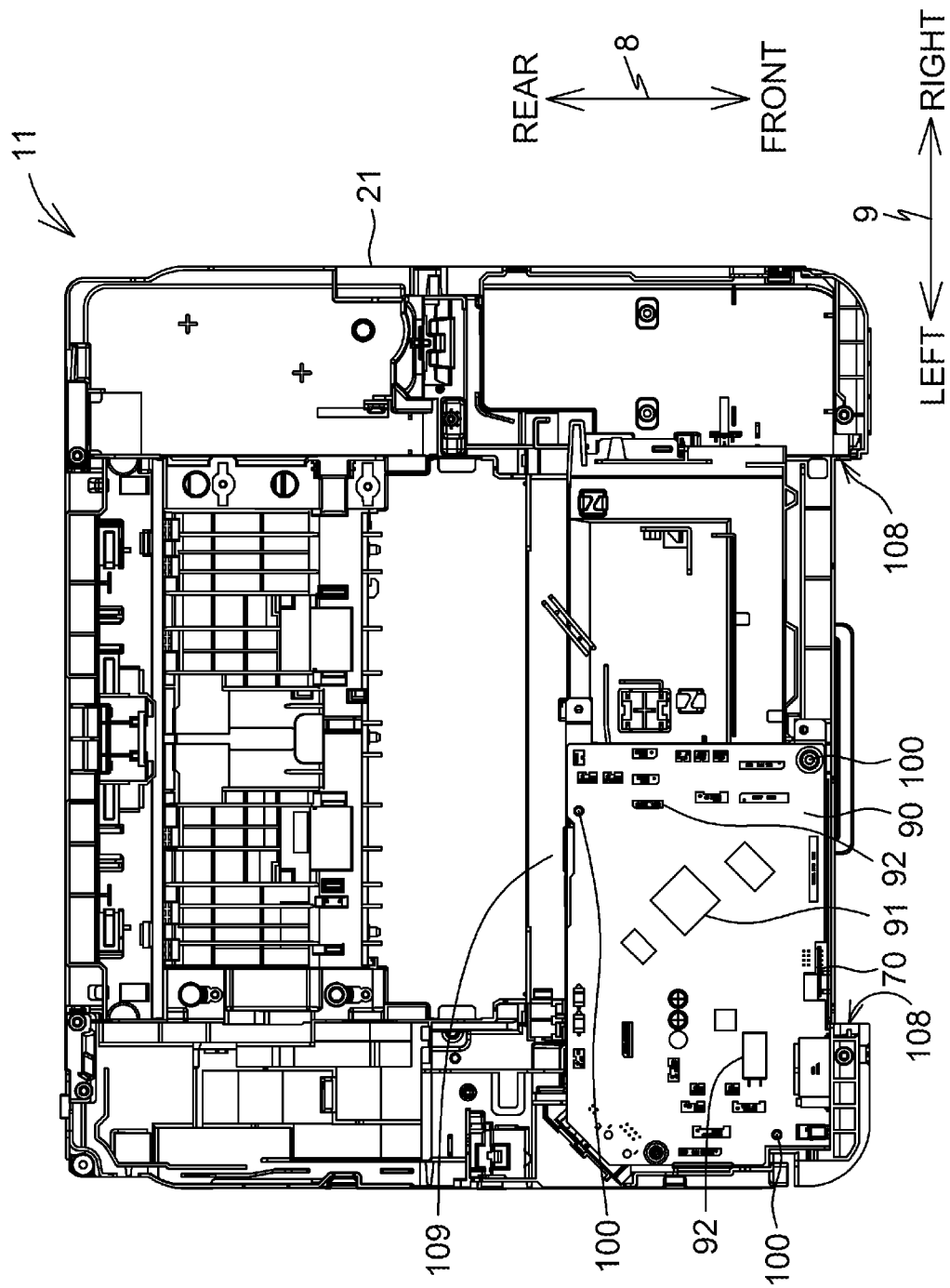
FIG. 4 is a plan view depicting the printer unit from which a second cover and a panel unit are omitted in the illustrative embodiment according to one or more aspects of the disclosure.

As depicted in FIG. 4, the control board 90 is disposed inside the housing 21. The control board 90 is disposed such that its upper and lower surfaces (as an example of first and second surfaces) extend in the front-rear direction 8 and in the right-left direction 9. That is, the upper and lower surfaces of the control board 90 extend parallel to a contact surface of the housing 21. The upper and lower surfaces refer to surfaces on which components 92 are mounted. The contact surface of the housing 21 refers to a surface that comes into contact with an installation surface (e.g., a table on which the housing 21 is to be installed) when the multifunction device 10 is installed on the installation surface. In the illustrative embodiment, the contact surface of the housing 21 may be a bottom surface of the housing 21. The control board 90 is disposed in a left front portion of the housing 21. The state where the first and second surfaces of the control board 90 extend parallel to the contact surface of the housing 21 includes a state where the first and second surfaces of the control board 90 are tilted slightly relative to the contact surface of the housing 21.

The control board 90 is supported by the sheet metal shield 93 (refer to FIG. 9) via metal pillars (not depicted). One ends of the pillars are fastened to the control board 90 using screws through respective holes 100 in the control board 90 and the other ends of the pillars are fastened to the sheet metal shield 93 using screws through respective holes 107 (refer to FIG. 9) in the sheet metal shield 93. As depicted in FIG. 5, the sheet metal shield 93 is supported by the support plate 109 via pillars 96. The control board 90 is covered by the second cover 130 (refer to FIG. 3) from above.

The control board 90 includes a microcomputer 91 and various components 92 mounted thereon. The components 92 include, for example, resistors, diodes, capacitors, and coils. The microcomputer 91 implements a control circuit for controlling driving of, for example, the drive motor (not depicted), the recording head 62, and the scanner unit 12. That is, the control board 90 includes the control circuit for controlling operation of the multifunction device 10.

As depicted in FIG. 7A, the connector 94 is mounted on a front end portion in a middle area of the control board 90 in the right-left direction 9. In the illustrative embodiment, as depicted in FIG. 7A, the connector 94 is mounted on the upper surface of the control board 90. Nevertheless, in other embodiments, for example, the connector 94 may be disposed on the lower surface of the control board 90.

The connector 94 may be a male connector. The connector 94 includes leads 95 that are bent. Therefore, a connecting portion of the connector 94 for connecting with a female connector faces a direction perpendicular to the top-bottom direction 7 (e.g., faces frontward in the illustrative embodiment) while the connector 94 is mounted on the control board 90. The connector 94 is connected to a female connector (not depicted) mounted on the communication board 70. That is, the control board 90 includes the connector 94 that is connected to the communication board 70. Nevertheless, in other embodiments, for example, a female connector may be mounted on the control board 90 and a male connector may be mounted on the communication board 70.

[Communication Board 70]

The communication board 70 is made of, for example, glass epoxy or paper phenol. The communication board 70 may be a printed board, at least the front surface of which is printed with a wiring pattern.

As depicted in FIGS. 4 and 6, the communication board 70 is disposed inside the housing 21. The communication board 70 is disposed such that its front and rear surfaces extend in the top-bottom direction 7 and in the right-left direction 9, i.e., the front and rear surfaces extend in a direction perpendicular to the direction in which the upper and lower surfaces of the control board 90 extend. The front and rear surfaces of the communication board 70 refer to surfaces on which electronic components (not depicted) and the connector 94 are mounted. The state where the front and rear surfaces of the communication board 70 extend in the direction perpendicular to the direction in which the upper and lower surfaces of the control board 90 extend includes a state where the front and rear surfaces of the communication board 70 and the upper and lower surfaces of the control board 90 are tilted slightly relative to each other.

The communication board 70 is supported by the control board 90 while the female connector (not depicted) of the communication board 70 is connected to the male connector 94 of the control board 90. The female connector is mounted on the rear surface of the communication board 70. The male connector 94 is mounted on the front surface of the control board 90. Thus, the communication board 70 is electrically connected with the control board 90 via the connector 94. The communication board 70 protrudes upward relative to the control board 90 while being supported by the control board 90 as depicted in FIGS. 6 and 7A.

The communication board 70 includes various electronic components (not depicted) mounted thereon. The various electronic components are used for performing wireless communication between the multifunction device 10 and an external device. The external device includes, for example, a digital camera or a personal computer. The wireless communication includes, for example, communication using Bluetooth® (Bluetooth® is a registered trademark owned by BLUETOOTH SIG. INC. of Kirkland, Wash.) or infrared rays. The various electronic components implement a communication circuit for performing wireless communication between the multifunction device 10 and an external device. That is, the communication board 70 includes a communication circuit.

[Relative Positional Relationship between Panel Unit 110 and Communication Board 70]

As depicted in FIGS. 3 and 10A, the communication board 70 is positioned further to the rear than a front end position F2 at which a front end of the support portion 116 is located and further to the front than a rear end position B at which a rear end of the support portion 116 is located. In the illustrative embodiment, the panel unit 110 includes the support portion 116, and therefore, the rear end position B coincides with a rear end position at which a rear end of the panel unit 110 is located. That is, in the front-rear direction 8 (as an example of a first direction), the communication board 70 is positioned entirely in a range from the front end to the rear end of the support portion 116. In other words, the communication board 70 is positioned entirely in a range, in the front-rear direction 8, from a rear end of the casing 111 of the panel unit 110 to the rear end of the support portion 116.

As depicted in FIGS. 3 and 10A, the communication board 70 is disposed further to the right than a left end position L at which a left end of the casing 111 of the panel unit 110 is located and further to the left than a right end position R at which a right end of the casing 111 of the panel unit 110 is located. That is, in the right-left direction 9 (as an example of a second direction) perpendicular to the front-rear direction 8 and the top-bottom direction 7 (as an example of a third direction), the communication board 70 is positioned entirely in a range from the left end to the right end of the panel unit 110 (e.g., the left end to the right end of the casing 111 of the panel unit 110). In other words, the communication board 70 is disposed behind the casing 111 of the panel unit 110.

In other embodiments, for example, as depicted in FIG. 10B, a portion of the communication board 70 may be located further to the rear than the rear end position B. As depicted in FIG. 10C, a portion of the communication board 70 may be located further to the front than the front end position F2. That is, a portion of the communication board 70 may be positioned outside of a range, in the front-rear direction 8, from the front end to the rear end of the support portion 116.

In other embodiments, for example, as depicted in FIG. 10D, a portion of the communication board 70 may be located further to the right than the right end position R. As depicted in FIG. 10E, a portion of the communication board 70 may be located further to the left than the left end position L. That is, a portion of the communication board 7 may be positioned outside of a range, in the right-left direction 9, from the right end to the left end of the casing 111

In other embodiments, for example, as depicted in FIG. 10F, the communication board 70 may be entirely located further to the left than the left end position L, further to the rear than a front end position F1 at which a front end of the casing 111 of the panel unit 110 is located, and further to the front than the rear end position B. That is, the communication board 70 may be positioned within a range, in the front-rear direction 8, from the front end of the panel unit 110 (e.g., the front end of the casing 111) to the rear end of the panel unit 110 (e.g., the rear end of the support portion 116).

In other embodiments, for example, as depicted in FIG. 10G, the communication board 70 may be entirely located further to the left than the left end position L and a portion of the communication board 70 may be located further to the rear of the rear end position B. As depicted in FIG. 10H, the communication board 70 may be entirely located further to the left than the left end position L and a portion of the communication board 70 may be located further to the front than the front end position F1. That is, a portion of the communication board 70 may be positioned outside of a range, in the front-rear direction 8, from the front end to the rear end of the panel unit 110 (e.g., the front end to the rear end of the casing 111). Alternatively, the communication board 70 may extend exactly over the range, in the front-rear direction 8, from the front end to the rear end of the panel unit 110.

[Effects Obtained by Illustrative Embodiments]

According to the illustrative embodiments, the communication board 70 may be positioned behind the casing 111 of the panel unit 110 and in the range, in the front-rear direction 8, from the front end of the casing 111 to the rear end of the support portion 116, thereby accomplishing reduction in size of the multifunction device 10.

According to the illustrative embodiments, at least a portion of the communication board 70 may be positioned in the range, in the front-rear direction 8, from the front end to the rear end of the panel unit 110, thereby accomplishing reduction in size of the multifunction device 10.

According to the illustrative embodiments, at least a portion of the communication board 70 may be positioned in the range, in the front-rear direction 8, from the front end to the rear end of the support portion 116 of the panel unit 110, thereby accomplishing reduction in size of the multifunction device 10.

According to the illustrative embodiments, at least a portion of the communication board 70 may be positioned in the range, in the front-rear direction 8, from the front end to the rear end of the panel unit 110 and in the range, in the right-left direction 9, from the right end to the left end of the panel unit 110, thereby accomplishing reduction in size of the multifunction device 10.

According to the illustrative embodiment, the second cover 130 has the cutout 132. Therefore, the connector of the communication board 70 may be connected to the connector 94 of the control board 90 via the cutout 132.

[Variations]

In the above-described illustrative embodiments, the panel unit 110 includes the support portion 116. This configuration enables the panel unit 110 to pivot in the direction of the arrow 106 (refer to FIG. 5) with respect to the housing 21. Nevertheless, in other embodiments, for example, the panel unit 110 might not include the support portion 116 so as not to be pivotable. In this case, the panel unit 110 may be supported by the housing 21 while the panel unit 110 is located in a stationary manner, for example, at the first position (e.g., the position of the panel unit 110 indicated by the solid line in FIG. 5).

The communication board 70, which is an example of a second circuit board, includes the communication circuit. However, in other embodiments, a second circuit board may include a power supply board on which a circuit for controlling a power supply to each mechanism disposed inside the housing 21 is mounted.

The multifunction device 10 is an example of an electronic apparatus. In other embodiments, for example, an electronic apparatus may be a telephone device or a personal computer.

Although the disclosure has been described based on illustrative embodiments and variations, the illustrative embodiments of the disclosure facilitate the understanding of the disclosure and do not limit the disclosure. The disclosure may be changed or modified without departing from the spirit of the invention and the scope of the claims and includes the equivalents thereof.

What is claimed is:

1. An electronic apparatus comprising:
    a housing having a contact surface configured to be in contact with an installation surface;
    a first circuit board disposed in the housing and extending parallel to the contact surface of the housing, the first circuit board including a control circuit configured to control operation of the electronic apparatus;
    a second circuit board disposed in the housing and extending perpendicular to the first circuit board, the second circuit board being electrically connected to the first circuit board; and
    a panel unit disposed at the housing, the panel unit including:
        a casing having a first end and a second end opposite to the first end in a first direction;
        at least one of a display unit and an input unit which are disposed at the first end of the casing, the display unit being configured to display an image and the input unit configured to allow input of an operation instruction; and
        a support portion supported by the housing and protruding from the second end of the casing in the first direction away from the first end of the casing,
    wherein the second circuit board is positioned behind the casing of the panel unit and in a range, in the first direction, from the second end of the casing to a protruding end of the support portion.

2. The electronic apparatus according to claim 1, wherein the casing of the panel unit has a third end and a fourth end opposite to the third end in a second direction which is perpendicular to the first direction, and a portion of the second circuit board is positioned outside of a range, in the second direction, from the third end to the fourth end of the casing.

3. The electronic apparatus according to claim 1, wherein a portion of the second circuit board is positioned outside of the range, in the first direction, from the second end of the casing to the protruding end of the support portion.

4. The electronic apparatus according to claim 1, wherein a surface of the first end of the casing of the panel unit is parallel to the second circuit board.

5. The electronic apparatus according to claim 1, wherein the support portion of the panel unit is supported by the housing such that the casing is pivotable relative to the housing.

6. The electronic apparatus according to claim 5, wherein the casing of the panel unit is pivotable relative to the housing between a first position in which a surface of the first end of the casing is parallel to the second circuit board, and a second position in which the surface of the first end of the casing is inclined relative to the second circuit board.

7. The electronic apparatus according to claim 1, wherein second circuit board includes a communication circuit configured to perform wireless communication with an external device.

8. The electronic apparatus according to claim 1, wherein the housing includes a first cover covering the second circuit board form above, the first cover including a holding portion which holds a cable extending from the panel unit.

9. The electronic apparatus according to claim 8, wherein the first cover has a recess configured to store liquid therein.

10. The electronic apparatus according to claim 1, wherein the first circuit board includes a connector connected to the second circuit board, and the housing includes a second cover covering the first circuit board from above and having a cutout formed along the connector.

11. An electronic apparatus comprising:
    a housing having a contact surface configured to be in contact with an installation surface;
    a first circuit board disposed in the housing and including a control circuit configured to control operation of the electronic apparatus, the first circuit board having a first surface and a second surface which are parallel to the contact surface of the housing;
    a second circuit board disposed in the housing and electrically connected to the first circuit board, the second circuit board having a third surface and a fourth surface which are perpendicular to the first surface and the second surface of the first circuit board; and
    a panel unit disposed at the housing and including at least one of a display unit configured to display an image and an input unit configured to allow input of an operation instruction, the panel unit having a first end and a second end opposite to the first end in a first direction which is perpendicular to the third surface and the fourth surface of the second circuit board,
    wherein the second circuit board is disposed adjacent to the panel unit and at least a portion of the second circuit board is positioned in a range, in the first direction, from the first end to the second end of the panel unit.

12. The electronic apparatus according to claim 11, wherein the panel unit further includes a support portion supported by the housing such that the panel unit is pivotable relative to the housing, the support portion having one end and the other end opposite to the one end in the first direction, and
    wherein the at least a portion of the second circuit board is positioned in a range, in the first direction, from one end to the other end of the support portion.

13. The electronic apparatus according to claim 11, wherein the panel unit has a third end and a fourth end opposite to the third end in a second direction, and the at least a portion of the second circuit board is positioned in a range, in the second direction, from the third end and the forth end of the panel unit, the second direction being perpendicular to the first direction and a third direction which is perpendicular to the first surface and the second surface of the first circuit board.

14. The electronic apparatus according to claim 11, wherein the panel unit has an outer surface in which the at least one of the display unit and the input unit is exposed, the outer surface being parallel to the second circuit board.

15. The electronic apparatus according to claim 11, wherein second circuit board includes a communication circuit configured to perform wireless communication with an external device.

* * * * *